United States Patent
Ito et al.

(10) Patent No.: US 8,419,988 B2
(45) Date of Patent: Apr. 16, 2013

(54) METHOD OF PRODUCING HONEYCOMB STRUCTURE

(75) Inventors: Toshikazu Ito, Nagoya (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 555 days.

(21) Appl. No.: 12/695,353

(22) Filed: Jan. 28, 2010

(65) Prior Publication Data
US 2010/0194004 A1    Aug. 5, 2010

(30) Foreign Application Priority Data

Feb. 3, 2009    (JP) .................................. 2009-022518
Jan. 26, 2010    (JP) .................................. 2010-014517

(51) Int. Cl.
*B29C 47/00*     (2006.01)
*C04B 33/32*     (2006.01)

(52) U.S. Cl.
USPC ..................... 264/177.12; 264/630; 264/669

(58) Field of Classification Search .................. 264/630, 264/631, 177.12
See application file for complete search history.

(56) References Cited

U.S. PATENT DOCUMENTS

| | | | |
|---|---|---|---|
| 5,268,415 A | * | 12/1993 | Pieterse et al. ................ 524/557 |
| 2002/0185786 A1 | | 12/2002 | Makino et al. |
| 2007/0148404 A1 | * | 6/2007 | Tomita et al. ................. 428/116 |
| 2007/0269634 A1 | * | 11/2007 | Suenobu et al. .............. 428/116 |

FOREIGN PATENT DOCUMENTS

| | | |
|---|---|---|
| JP | 3074169 B2 | 6/2000 |
| JP | 3227039 B2 | 8/2001 |

OTHER PUBLICATIONS

Sarkar, N. "Thermal Gelation Properties of Methyl and Hydroxypropyl Methylcellulose." Journal of Applied Polymer Science, vol. 24, Issue 4, pp. 1073-1087 (1979).*

* cited by examiner

*Primary Examiner* — Joseph Del Sole
*Assistant Examiner* — Erin Snelting
(74) *Attorney, Agent, or Firm* — Burr & Brown (57) ABSTRACT

A method of producing a honeycomb structure includes producing a honeycomb structure using methyl cellulose as at least part of a binder, the methyl cellulose having a weight average molecular weight (Mw) of 4,000,000 to 5,000,000, and having an integral molecular weight distribution value of components having a molecular weight of 100,000 or less in the integral molecular weight distribution curve of 15 or less.

6 Claims, 1 Drawing Sheet

METHOD OF PRODUCING HONEYCOMB STRUCTURE

BACKGROUND OF THE INVENTION

1. Field of the Invention

The present invention relates to a method of producing a honeycomb structure. More particularly, the present invention relates to a method of producing a large honeycomb structure such as a honeycomb structure installed in a large-sized automobile or a honeycomb structure that is divided into a plurality of structures to form final products.

2. Discussion of the Background

A honeycomb structure that is used as a carrier for an automotive exhaust gas purification catalyst is normally produced by extrusion in order to improve mass productivity. Therefore, a forming aid (e.g., binder) and the like are used in addition to the raw material for the base material.

As the binder, cellulose derivatives such as methyl cellulose and hydroxypropyl methyl cellulose have been used. In particular, methyl cellulose that exhibits high gel strength has been suitably used when forming a honeycomb structure using a ram extruder.

However, since a cellulose binder that is currently used normally contains low-molecular-weight components, the low-molecular-weight components contained in the binder may be evaporated together with steam when drying the formed body, cooled and condensed at the inside periphery of the dryer, and adhere to the inside of the dryer. In this case, the adhering low-molecular-weight components may contaminate the dryer, or may be removed from the dryer during drying to adhere and contaminate the product. When the amount of adhering low-molecular-weight components increases to a large extent, the low-molecular-weight components may ignite along with an increase in temperature so that a fire may occur. In order to prevent such a problem, it is necessary to periodically clean the dryer so that the production efficiency and the work efficiency decrease.

If the average molecular weight of the binder is too high, the resulting clay may become hard and extrusion may become difficult. Therefore, a binder which is normally used has been prepared by blending celluloses that differ in molecular weight to achieve the desired average molecular weight. However, since such a cellulose binder contains low-molecular-weight components in order to achieve the desired average molecular weight, the low-molecular-weight components are necessarily evaporated together with steam during drying. This results in the above problem.

When using methyl cellulose as a binder, the fluidity of the clay may decrease if the amount of methyl cellulose to be added is small, so that extrusion may become difficult. Moreover, deformation or cracks may easily occur during drying due to a decrease in dry strength. If the amount of methyl cellulose to be added is large, the amount of heat produced by combustion of methyl cellulose may increase during firing so that cracks may easily occur in the honeycomb structure.

When producing a large honeycomb structure that is installed in a heavy-duty truck or the like, low-molecular-weight components are evaporated together with steam during drying when using methyl cellulose that contains a large amount of low-molecular-weight components. As a result, cracks may easily occur during drying due to a decrease in strength. Moreover, a variation in dimensional accuracy or the like may occur so that the yield of the fired honeycomb structure (final product) may decrease.

Japanese Patent No. 3074169 and Japanese Patent No. 3227039 disclose measures aimed at solving the above problems.

Japanese Patent No. 3074169 aims at providing a method of producing a cordierite ceramic honeycomb structure that is suitable for mass production and produces a honeycomb structure having a reduced partition wall thickness by improving formability (particularly fluidity) during extrusion. This document discloses adding 2 to 6 wt % of a reversible thermally gelling binder to a cordierite-forming raw material batch, the reversible thermally gelling binder being prepared by mixing a reversible thermally gelling binder having a viscosity (2% aqueous solution) (20° C.) of 5000 cp or less and a reversible thermally gelling binder having a viscosity (2% aqueous solution) (20° C.) of 20,000 cp or more, the mixing being performed in a range of 10/90 wt % to 50/50 wt %.

Japanese Patent No. 3227039 aims at providing a method of producing a cordierite honeycomb structure that can maintain fluidity when the ceramic clay passes through the die while improving a shape holding capability, and can prevent occurrence of cracks during drying. This document discloses adding 1.5 to 4 wt % of hydroxypropoxyl methyl cellulose and 0.5 to 3 wt % of methyl cellulose to a cordierite raw material so that the total amount of the hydroxypropoxyl methyl cellulose and the methyl cellulose is 2 to 7 wt %, the methyl cellulose having a viscosity (2% aqueous solution) (20° C.) of 8000 cp or more, the hydroxypropoxyl methyl cellulose having a viscosity (2% aqueous solution) (20° C.) of 8000 cp or more and a value obtained by subtracting the number of moles of hydroxypropoxyl groups added per glucose ring unit from the average number of hydroxyl groups in the glucose ring unit that are substituted with a methoxy group being 1.5 or more.

SUMMARY OF THE INVENTION

A known binder cannot prevent contamination of products or occurrence of fire due to contamination of dryer resulting from adhesion of low-molecular-weight components to prevent a decrease in production efficiency and work efficiency. In particular, a large honeycomb structure tends to produce cracks, undergo a variation in dimensional accuracy or the like, and decrease yield. Fired honeycomb structures are not obtained in sufficient yield. Therefore, a solution for the above problems has been desired.

The present invention was conceived in view of the above problems. The inventors of the present invention found that contamination of a dryer can be suppressed (i.e., adhesion of low-molecular-weight components to a dryer can be reduced) so that contamination of products and a fire from the dryer can be prevented, and a situation in which cracks in a honeycomb structure due to a significant heat of combustion caused by methyl cellulose during firing can be suppressed by utilizing a binder that contains methyl cellulose having a weight average molecular weight (Mw) of 4,000,000 to 5,000,000, and having an integral molecular weight distribution value of components having a molecular weight of 100,000 or less in the integral molecular weight distribution curve of 15 or less. This finding has led to the completion of the present invention. The present invention may also provide a method of producing a honeycomb structure that can suppress occurrence of cracks in a formed body (fired honeycomb structure), suppress a variation in dimensional accuracy or the like, and improve yield, even when producing a large honeycomb structure that is significantly larger in diameter and/or length than a known honeycomb structure.

[1] A method of producing a honeycomb structure using methyl cellulose as at least part of a binder, the methyl cellulose having a weight average molecular weight (Mw) of 4,000,000 to 5,000,000, and having an integral molecular weight distribution value of components having a molecular weight of 100,000 or less in the integral molecular weight distribution curve of 15 or less.

[2] The method according to [1], wherein the methyl cellulose is used in an amount of 2 to 5 mass % based on the total amount of a raw material for forming a honeycomb formed body.

[3] The method according to [1], wherein hydroxypropyl methyl cellulose in an amount of 2 mass % or less is used in combination with the methyl cellulose in an amount of 2 mass % or more so that the total amount of the hydroxypropyl methyl cellulose and the methyl cellulose is 5 mass % or less.

[4] The method according to any one of [1] to [3], wherein the honeycomb structure has an outer diameter of 229 mm or more and a roundness of 1 mm or less.

[5] The method according to any one of [1] to [3], wherein the honeycomb structure has a length of 500 mm or more and an amount of curvature of 1 mm or less after drying.

[6] The method according to any one of [1] to [4], wherein a dielectric dryer is used.

Since the method of producing a honeycomb structure according to the present invention utilizes a methyl cellulose having a weight average molecular weight (Mw) of 4,000,000 to 5,000,000, and having an integral molecular weight distribution value of components having a molecular weight of 100,000 or less in the integral molecular weight distribution curve of 15 or less as at least a part of the binder, it is possible to use methyl cellulose for which the amount of low-molecular-weight components is controlled to a value within the desired range. Therefore, contamination of the dryer due to the low-molecular-weight components can be prevented, so that contamination of products and a fire from the dryer due to the components can be prevented, while suppressing a situation in which cracks occur due to an increase in the amount of combustion heat caused by methyl cellulose during firing. Moreover, when producing a large honeycomb structure, cracks rarely occur in the formed body (fired honeycomb structure), a variation in dimensional accuracy or the like can be suppressed, and yield can be improved.

DETAILED DESCRIPTION OF THE INVENTION

Preferred embodiments of the method of producing a honeycomb structure according to the present invention are described in detail below. Note that the present invention is not limited to the following embodiments. The present invention encompasses a wide range of methods of producing a honeycomb structure that satisfy the requirements of the present invention.

[1] Method of Producing Honeycomb Structure

The method of producing a honeycomb structure according to the present invention includes producing a honeycomb structure using methyl cellulose having a weight average molecular weight (Mw) of 4,000,000 to 5,000,000, and having an integral molecular weight distribution value of components having a molecular weight of 100,000 or less in the integral molecular weight distribution curve of 15 or less.

[1-1] Methyl Cellulose

The methyl cellulose used in the method of producing a honeycomb structure according to the present invention has a weight average molecular weight (Mw) of 4,000,000 to 5,000,000, and has an integral molecular weight distribution value of components having a molecular weight of 100,000 or less in the integral molecular weight distribution curve of 15 or less. Specifically, methyl cellulose for which the amount of low-molecular-weight components is controlled within a given range can be obtained by adjusting the production conditions so that methyl cellulose having a given weight average molecular weight and a given average molecular weight distribution is obtained. When using the above methyl cellulose as a binder of a honeycomb formed body, evaporation of low-molecular-weight components together with steam during drying can be prevented. This prevents a situation in which the dryer or the product is contaminated. Another advantage includes preventing a fire, and improving the production efficiency and the work efficiency. Moreover, the amount of methyl cellulose used can be reduced by utilizing the above methyl cellulose.

If the weight average molecular weight (Mw) of the methyl cellulose is 4,000,000 or less, the resulting clay may become too soft. If the weight average molecular weight (Mw) of the methyl cellulose is 5,000,000 or more, the resulting clay may become too hard. Since the weight average molecular weight increases when the amount of high-molecular-weight components is large, it is desirable that the amount of each component in the integral molecular weight curve be within the desired range in addition to the average molecular weight. According to this embodiment, methyl cellulose in which the amount of low-molecular-weight components is small can be utilized by adjusting the weight average molecular weight (Mw) of the methyl cellulose and the content of components (low-molecular-weight components) having a molecular weight of 100,000 or less to values within the desired ranges. This suppresses contamination of the dryer, prevents contamination of the product and occurrence of a fire of the dryer, and suppresses occurrence of cracks during firing. Moreover, when producing a large honeycomb structure, cracks rarely occur in the formed body (fired honeycomb structure), a variation in dimensional accuracy or the like can be suppressed, and yield can be improved.

The weight average molecular weight (Mw) may be measured by gel permeation chromatography (GPC), for example. In this case, a GPC manufactured by Tosoh Corp ("HLC-8220GPC" and four separation columns "TSK GMP-WXL") may be used. As the gel permeation chromatography (GPC) measurement conditions, the column temperature is set at 40° C., eluent is 0.1 M-$CH_3COONa$, and the flow rate is set at 0.8 ml/min. A 0.1 mass % aqueous solution of a sample used as the binder is prepared, and filtered through a filter having a pore size of 0.45 μm. This is used to measure. The weight average molecular weight (Mw) of the resulting product is measured. The molecular weight is calculated using a calibration curve (analytical curve). The calibration curve is obtained using a pullulan standard (manufactured by Showa Denko K.K.). The integral molecular weight distribution value of components having a molecular weight of 100,000 or less in the integral molecular weight distribution curve is determined by drawing an integral molecular weight distribution curve using the measurement results, and reading the integral molecular weight distribution value from the graph.

If the integral molecular weight distribution value of components having a molecular weight of 100,000 or less in the integral molecular weight distribution curve exceeds 15, cracks may easily occur during firing, even if the methyl cellulose has a weight average molecular weight (Mw) of 4,000,000 to 5,000,000, which is unfavorable.

The methyl cellulose according to the present invention preferably has a viscosity (2% aqueous solution) at 20° C. of 6000 to 11,000 mPa·s. If the methyl cellulose has a viscosity within the above range, the methyl cellulose achieves more preferable effects.

When producing a honeycomb structure using the above methyl cellulose, it is preferable to employ extrusion using a ram extruder. Since methyl cellulose has essentially a high gel strength and a low gelling temperature, continuous forming that tends to increase the forming temperature is not suitable for methyl cellulose.

The methyl cellulose according to the present invention is preferably used in an amount of 2 to 5 mass % based on 100 mass (dry mass) of the forming raw material. The production efficiency during (extrusion) forming can be improved by utilizing the above methyl cellulose within the above range. If the amount of the methyl cellulose is less than 2 mass %, the fluidity of the clay may decrease so that extrusion may become difficult. Moreover, deformation or cracks may easily occur during drying due to a decrease in dry strength. If the amount of the methyl cellulose is more than 5 mass %, the amount of heat produced by combustion of the methyl cellulose during firing may increase so that cracks may easily occur, which is unfavorable.

It is also preferable to use hydroxypropyl methyl cellulose in combination with the methyl cellulose according to the present invention in an amount of 2 mass % or less of raw material of ceramic forming body so that the total amount of the hydroxypropyl methyl cellulose and the methyl cellulose is 2 to 5 mass % of raw material of ceramic forming body. If hydroxypropyl methyl cellulose is used in an amount of more than 2 mass %, the honeycomb structure undergoes a significant dimensional change due to a decrease in gel strength, which is unfavorable. If the methyl cellulose is used in an amount larger or smaller than the desired amount, the above problem may occur during extrusion, drying, or firing, which is unfavorable. If the total amount of the methyl cellulose and the hydroxypropyl methyl cellulose exceeds 5 mass %, above described problem caused by the methyl cellulose or hydroxypropyl methyl cellulose may occur depending on the blending amount of the methyl cellulose or hydroxypropyl methyl cellulose, which is unfavorable.

It is preferable that the hydroxypropyl methyl cellulose used together with the methyl cellulose have a viscosity (2% aqueous solution) at 20° C. of 2000 to 20,000 mPa·s. It is also preferable that the hydroxypropyl methyl cellulose used together with the methyl cellulose have a weight average molecular weight (Mw) of 4,000,000 to 5,000,000, and have an integral molecular weight distribution value of components having a molecular weight of 100,000 or less in the integral molecular weight distribution curve of 15 or less. Such a hydroxypropyl methyl cellulose can be obtained by adjusting the production conditions so that hydroxypropyl methyl cellulose having a given weight average molecular weight and a given average molecular weight distribution is obtained.

When using the hydroxypropyl methyl cellulose together with the methyl cellulose in the desired amount, continuous forming can be implemented without using a deairing machine. Specifically, since the hydroxypropyl methyl cellulose has a relatively low gel strength and a high gelling temperature, the forming raw material is rarely gelled and exhibits its sufficient fluidity under the forming conditions so that the continuous forming can be implemented.

[1-2] Production of Honeycomb Structure

A method of producing a honeycomb structure according to one embodiment of the present invention is described below. In the method of producing a honeycomb structure according to one embodiment of the present invention, a forming raw material that contains a ceramic raw material is formed to produce a honeycomb structure that includes a plurality of porous partition walls that are formed along the horizontal direction of the honeycomb structure, a plurality of cells that are defined and enclosed by the partition walls, and an outer circumferential wall that is formed to cover the periphery of the cells.

The ceramic raw material that forms the honeycomb structure is not particularly limited. It is preferable that the ceramic raw material be at least one material selected from the group consisting of a cordierite-forming raw material, an aluminum titanate-forming raw material, silicon carbide, alumina, mullite, and silicon nitride, from the viewpoint of strength, heat resistance, corrosion resistance, and the like. This ensures that the resulting honeycomb structure exhibits excellent strength and heat resistance.

The term "cordierite-forming raw material" used herein refers to a raw material that forms cordierite upon firing. Specifically, the cordierite-forming raw material is a ceramic raw material prepared by mixing given raw materials so that the content of silica ($SiO_2$) is 42 to 56 mass %, the content of alumina ($Al_2O_3$) is 30 to 45 mass %, and the content of magnesia (MgO) is 12 to 16 mass %. Examples of the given raw materials include talc, kaolin, an alumina source raw material, silica, and the like. The term "alumina source raw material" used herein refers to a raw material (e.g., aluminum oxide, aluminum hydroxide, and boehmite) that is oxidized upon firing to form part of cordierite. The term "aluminum titanate-forming raw material" used herein refers to a raw material that forms aluminum titanate upon firing. Specifically, the aluminum titanate-forming raw material is a ceramic raw material prepared by mixing given raw materials so that the content of alumina ($Al_2O_3$) is 53 to 74 mass %, the content of titanium ($TiO_2$) is 14 to 33 mass %, and the content of silica ($SiO_2$) is 6 to 20 mass %. The content of the ceramic raw material is preferably 40 to 90 mass % in terms of chemical composition based on the total amount (dry mass) of the forming raw material.

The average particle size of the ceramic raw material is not particularly limited, but is preferably 1 to 80 µm, and more preferably 2 to 40 µm. The term "average particle size" used herein refers to a value measured using a laser diffraction particle size analyzer.

Additives such as a pore-forming material and a surfactant as the other forming raw material are mixed with the ceramic raw material to form a 100 mass in total to prepare a raw material for forming. In this embodiment, it is indispensable to use a binder that contains the methyl cellulose having an integral molecular weight distribution value of components having a molecular weight of 100,000 or less in the integral molecular weight distribution curve of 15 or less even if having a weight average molecular weight (Mw) of 4,000,000 to 5,000,000.

A dispersion medium is added to the total forming raw material during forming. It is preferable to use water as the dispersion medium. The dispersion medium is preferably added in an amount of 10 to 30 parts by mass based on 100 parts by mass of the ceramic raw material.

The pore-forming material is not particularly limited insofar as pores can be formed by firing. Examples of the pore-forming material include starch, resin foam, a water-absorbent resin, silica gel, carbon, and the like. The content of the pore-forming material is preferably 0 to 15 mass % based on the total amount of the forming raw material.

Examples of the surfactant include ethylene glycol, dextrin, fatty acid soap, polyalcohol, and the like. These surfactants may be used either individually or in combination. The content of the surfactant is preferably 5 mass % or less based on the total amount of the forming raw material.

After the addition of water which is dispersion medium to the forming raw material, the materials are kneaded to prepare clay. The resulting clay is formed into a honeycomb shape. The clay may be prepared by kneading the forming raw material using a kneader, a vacuum deairing machine, or the like. Note that it is preferable to use a vacuum deairing machine or the like that can be cooled. Since the methyl cellulose to be added according to the present invention exhibits a high gel strength, but has a low gelling temperature, if cooling is insufficient the temperature of the clay may increase and gelation may occur during kneading, so that extrusion may become difficult.

The honeycomb formed body may be produced by forming the clay using a ram extruder, for example. Note that the forming method is not limited thereto.

The resulting honeycomb formed body is then dried. The honeycomb formed body may be dried by an electromagnetic wave heating method (e.g., microwave heat drying or high-frequency dielectric heat drying) or an external heating method (e.g., hot-blast drying or superheated steam drying), for example. Note that the drying method is not limited thereto. For example, it is preferable to dry a given amount of water by the electromagnetic wave heating method, and then dry the remaining water by the external heating method, since the entire honeycomb formed body can be quickly and uniformly dried without causing cracks. In this case, it is preferable to remove water corresponding to 30 to 95 mass % of the water content before drying by the electromagnetic wave heating method, and then reduce the water content to 3 mass % or less by the external heating method.

It is more preferable to produce the honeycomb structure using a dielectric dryer. When drying the honeycomb structure by dielectric drying using a dielectric dryer, low-molecular-weight components are difficult to evaporate particularly during vaporization of steam so that the effects of the present invention can be more reliably achieved. The drying temperature when drying the honeycomb structure using a dielectric dryer is 80 to 180° C., and the drying time is 10 minutes to 10 hours. Note that the drying temperature and the drying time are not limited thereto.

As an example, a dielectric dryer has an upper electrode and a lower electrode in dielectric drying device, an upper electrode and a lower electrode being placed upper and lower of the honeycomb formed body (unfired formed body) and opposite to each other. A high-frequency current is generated between an upper electrode and a lower electrode of a dielectric dryer, and the honeycomb formed body is heated and dried from the inside of the partition walls and the outer circumferential wall of the honeycomb formed body due to a dielectric loss that occurs inside the partition walls and the outer circumferential wall of the honeycomb formed body. Specifically, the honeycomb formed body is heated and dried by dielectric drying in proportion to the electric field distribution formed therein. The oscillation frequency of the high-frequency current that is generated during dielectric drying is preferably 3 to 100 MHz. It is more preferable that the oscillation frequency be 6 to 50 MHz that is utilized for an industrial heating furnace from the viewpoint of the equipment cost.

After drying the honeycomb structure, the honeycomb structure is optionally plugged, followed by firing (calcining).

The dried honeycomb structure is calcined before firing in order to degrease the honeycomb structure. For example, the honeycomb structure is calcined at 550° C. for about three hours in an oxidizing atmosphere. Note that the calcining conditions are preferably adjusted depending on the amount and the type of organic substance (e.g., methyl cellulose used as the binder, dispersant, and pore-forming material) contained in the honeycomb formed body. The combustion temperature of the binder is normally about 100 to 300° C., and the combustion temperature of the pore-forming material is normally about 200 to 800° C. Therefore, the calcining temperature may be set at about 200 to 1000° C. The calcining time is normally about 3 to 100 hours. Note that the calcining time is not limited thereto.

The honeycomb structure is then fired (firing). The term "firing" refers to sintering the forming raw material contained in the calcined body to effect densification so that the resulting product has a given strength. The firing conditions (temperature and time) differ depending on the type of forming raw material. The firing conditions may be appropriately selected corresponding to the type of forming raw material. For example, a cordierite raw material is preferably fired at 1410 to 1440° C. for about 3 to 10 hours. A silicon carbide raw material is fired at about 1400 to 1500° C. Note that the firing conditions are not limited thereto. Note also that calcining and firing may be implemented by a single firing operation.

A honeycomb structure having a desired porosity and average pore size can be produced by adjusting the particle size and the amount of the ceramic raw material to be used (aggregate particles) and the particle size and the amount of the pore-forming material to be added, as required.

The external shape of the formed honeycomb structure is not particularly limited. For example, the honeycomb structure may have a cylindrical shape, a quadrangular prism shape, a triangular prism shape, or the like.

The shape of the cells of the honeycomb structure (i.e., the shape of the cells in the cross section perpendicular to the cell formation direction) may be rectangular (quadrilateral), hexagonal, triangular, or the like. Note that the shape of the cells is not limited thereto. The cells may have an arbitrary shape employed for a honeycomb structure.

The cell density of the honeycomb structure is not particularly limited, but is preferably 50 to 1500 cells/in$^2$ (7.8 to 233 cells/cm$^2$) that is normally employed for a large honeycomb structure. The thickness of the partition wall is preferably 20 to 1000 µm.

It is preferable to optionally form a structure in which one open end and the other open end of the cells of the honeycomb structure are alternately plugged.

The method of producing a honeycomb structure according to a preferred embodiment of the present invention is used to produce a honeycomb structure having an outer diameter of 229 mm or more and a roundness of 1 mm or less. Specifically, a honeycomb structure of which the roundness (maximum outer diameter−minimum outer diameter) is controlled to 1 mm or less can be produced while improving the shape accuracy of the honeycomb structure having a diameter of 229 mm or more, by utilizing the desired methyl cellulose or a combination of the desired methyl cellulose and hydroxypropyl methyl cellulose, which was conventionally difficult. Specifically, it has been difficult to achieve a preferred roundness (maximum outer diameter−minimum outer diameter) when producing a large honeycomb structure having an outer diameter of 229 mm or more. Because, cracks tend to occur when an external stress or a stress applied during reproduction of a catalyst support is applied to part or the entirety of the honeycomb structure. However, since a honeycomb structure produced by the method according to a preferred embodiment of the present invention can achieve a preferred roundness (maximum outer diameter−minimum outer diameter), occurrence of cracks can be prevented.

The method of producing a honeycomb structure according to the present invention may also be suitably used to produce a dried honeycomb structure (dried body) that has a length of 500 mm or more and an amount of curvature of 1 mm or less after extruding. Specifically, the amount of curvature of a so called long honeycomb structure of which the length in the cell formation direction is 500 mm or more can be reduced to 1 mm or less, by utilizing the desired methyl cellulose or a combination of the desired methyl cellulose and hydroxypropyl methyl cellulose. This was conventionally difficult. A large honeycomb structure that has a length of 500 mm or more after drying tends to be curved due to the weight of the honeycomb structure and the like. As a result, an external stress or a stress applied during reproduction tends to be applied to part or the entirety of the honeycomb structure so that cracks tend to occur. However, since the amount of curvature of a honeycomb structure produced by the method according to the present invention can be reduced to 1 mm or less even if the honeycomb structure has a desirable large size, occurrence of cracks can be prevented. Moreover, since a plurality of honeycomb structures can be produced by forming and drying a honeycomb structure having a length of 500 mm or more in the cell formation direction, and cutting the honeycomb structure to given dimensions, productivity can be improved as compared with the case of individually forming, drying, and firing a honeycomb structure having a normal length.

Note that the term "amount of curvature" used herein refers to the amount (in mm) of deformation with respect to the design outer circumferential surface of the honeycomb structure.

EXAMPLES

The present invention is further described below by way of examples. Note that the present invention is not limited to the following examples. In the examples and comparative examples, the units "parts" and "%" respectively refer to "parts by mass" and "mass %" unless otherwise indicated. In the examples and comparative examples, properties and the like were evaluated and measured by the following methods.

[1] Measurement of Molecular Weight

The molecular weight was measured by gel permeation chromatography (GPC). A GPC manufactured by Tosoh Corp ("HLC-8220GPC" and four separation columns "TSK GMP-WXL") was used to measure the molecular weight. As the gel permeation chromatography (GPC) measurement conditions, the column temperature was set at 40° C., eluent is 0.1 M-$CH_3COONa$, and the flow rate was set at 0.8 ml/min. A 0.1 mass % of a binder sample was prepared, and filtered through a filter having a pore size of 0.45 μm. The calibration curve (analytical curve) was obtained using a pullulan standard (manufactured by Showa Denko K.K.).

[2] Measurement of Viscosity

The viscosity of a 2% aqueous solution of a binder sample was measured at 20° C. using a TVB-10 Uviscometer (manufactured by Toki Sangyo Co., Ltd.).

[3] Contamination of Dryer

After drying the honeycomb structure, contamination inside the dryer was observed with the naked eye, and evaluated as follows.
Good: Adhesion of low-molecular-weight components was not observed and no contamination was observed.
Bad: Adhesion of low-molecular-weight components was observed and contamination was observed.

[4] State of Outer Wall of Formed Body

The state of the outer wall of the honeycomb body during forming was observed with the naked eye.
Good: Cracks, split-like defects, small holes, and the like were not observed on the outer wall.
Bad: Cracks, split-like defects, small holes, and the like were observed on the outer wall.

[5] Roundness

Whether or not the honeycomb structure was deformed was determined using a gauge. Specifically, the roundness indicates the degree of deformation of the outer circumferential surface based on the dimensions of the honeycomb filter of each example, comparative example, and reference example. When the honeycomb filter was formed to have an elliptical shape, the roundness indicates the degree of deformation based on the dimensions of the elliptical honeycomb filter without being limited to the term "roundness".

[6] Cracks During Firing

The presence or absence of cracks when firing the honeycomb structure was observed with the naked eye, and evaluated as follows.
Good: No cracks were observed.
Bad: Cracks were observed.

Example 1

A cordierite-forming raw material was prepared as a ceramic raw material including ceramic material using talc (40 mass %), kaolin (17 mass %), calcined kaolin (23 mass %), silica (1 mass %), alumina (10 mass %), and aluminum hydroxide (8 mass %) so that the content of $SiO_2$ was 42 to 56 mass %, and preferably 47 to 53 mass %, the content of $Al_2O_3$ was 30 to 45 mass %, and preferably 32 to 38 mass %, and the content of MgO was 12 to 16 mass %, and preferably 12.5 to 15 mass %, based on the theoretical cordierite composition ($2MgO.2Al_2O_3.5SiO_2$).

As a binder, methyl cellulose (MC) having a weight average molecular weight (Mw) of 4,100,000 and a viscosity (2% aqueous solution) at 20° C. of 6000 mPa·s, and having an integral molecular weight distribution value of components having a molecular weight of 100,000 or less in the integral molecular weight distribution curve of 14 (C in Table 1), was added to the cordierite-forming raw material in an amount of 4 mass % (Example 1 in Table 2) to the total cordierite-forming raw material. Water in an amount of 33 parts by mass based on 100 parts by mass of the cordierite-forming raw material and a surfactant in an amount of 0.2 parts by mass based on 100 parts by mass of the cordierite-forming raw material was added. A ceramic clay that was plasticized to allow extrusion, the clay was prepared, mixed, kneaded, deaired, and extruded to obtain an undried honeycomb formed body. These operations were performed using a mixer, a kneader, a vacuum deairing machine, and an extruder.

The undried honeycomb formed body was dried using a dielectric dryer to obtain a dried honeycomb formed body having a length of 210 mm. The drying temperature and the drying time of the dielectric dryer were set to 95° C. and 30 minutes, respectively. The oscillation frequency of a high-frequency current was set to 13 MHz. The dried honeycomb formed body was then cut to a given length.

The dried honeycomb formed body thus obtained was fired at 1410 to 1440° C. for eight hours to obtain a honeycomb formed body of Example 1 having a diameter of 229 mm×a length of 152 mm, a partition wall thickness of 150 µm, and a cell density of 62 cells/cm² (400 cpsi).

Example 2

Figure 1:
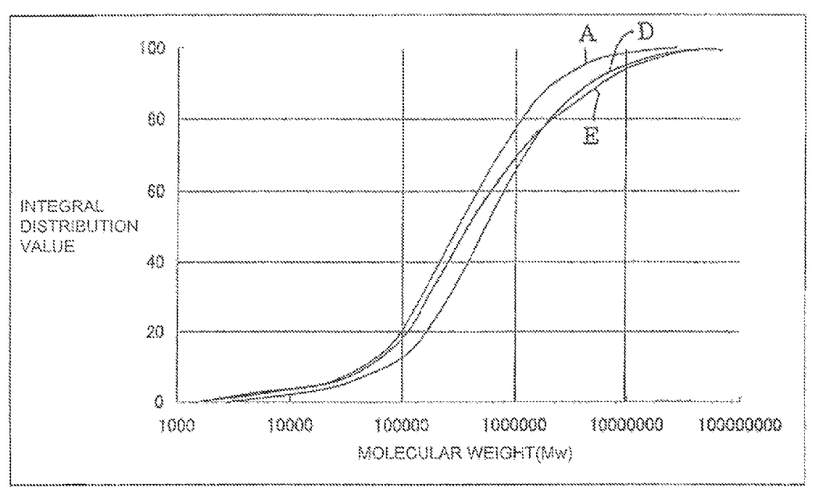
FIG. 1 is a graph showing an integral molecular weight distribution curve that indicates the relationship between the molecular weight (Mw) and the integral molecular weight distribution value of methyl cellulose.

A cordierite-forming raw material was prepared in the same manner as in Example 1. As a binder, methyl cellulose (MC) having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), was added to the cordierite-forming raw material in an amount of 4 mass % (Example 2 in Table 2). The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body in the same manner as in Example 1. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Example 2 having a diameter of 229 mm×a length of 152 mm, a partition wall thickness of 150 µm, and a cell density of 62 cells/cm² (400 cpsi). The relationship between the integral molecular weight distribution value and the molecular weight of the methyl cellulose D is indicated by the curve D shown in FIG. 1.

Example 3

A cordierite-forming raw material was prepared in the same manner as in Example 1. As a binder, methyl cellulose (MC) having a weight average molecular weight (Mw) of 4,900,000 and a viscosity (2% aqueous solution) at 20° C. of 11,000 mPa·s, and having an integral molecular weight distribution value of components having a molecular weight of 100,000 or less in the integral molecular weight distribution curve of 12 (F in Table 1), was added to the cordierite-forming raw material in an amount of 4 mass % (Example 3 in Table 2). The dispersion medium, the pore-forming material, and the surfactant in the same manner as in Example 1 were added. A ceramic clay that was plasticized to allow extrusion was prepares, mixed, kneaded, deaired, and extruded to obtain an undried honeycomb formed body in the same manner as in Example 1. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Example 3 having a diameter of 229 mm×a length of 152 mm, a partition wall thickness of 150 µm, and a cell density of 62 cells/cm² (400 cpsi).

Example 4

A cordierite-forming raw material was prepared in the same manner as in Example 1. As a binder, methyl cellulose (MC) having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), was added to the cordierite-forming raw material in an amount of 5 mass % (Example 4 in Table 2). The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Example 4 having a diameter of 229 mm×a length of 152 mm, a partition wall thickness of 150 µm, and a cell density of 62 cells/cm² (400 cpsi). The relationship between the integral molecular weight distribution value and the molecular weight of the methyl cellulose D is indicated by the curve D used herein shown in FIG. 1.

Example 5

A cordierite-forming raw material was prepared in the same manner as in Example 1. As a binder (1), methyl cellulose (MC) having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), and as a binder (2) hydroxypropyl methyl cellulose (HPMC) having a weight average molecular weight (Mw) of 4,600,000 and a viscosity (2% aqueous solution) at 20° C. of 10,000 mPa·s, and having an integral molecular weight distribution value of components having a molecular weight of 100,000 or less in the integral molecular weight distribution curve of 14 (H in Table 1), were respectively added to the cordierite-forming raw material in an amount of 2 mass % (Example 5 in Table 2). The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. These operations were performed using a mixer, a kneader, a vacuum deairing machine, and an extruder. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Example 5 having a diameter of 229 mm×a length of 152 mm, a partition wall thickness of 150 µm, and a cell density of 62 cells/cm² (400 cpsi).

Example 6

A cordierite-forming raw material was prepared in the same manner as in Example 1. As a binder, methyl cellulose (MC) used in Examples 2 and 4 having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), was added to the cordierite-forming raw material in an amount of 4 mass % (Example 2 in Table 2). The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain an elliptical honeycomb formed body of Example 6 having a major axis of 229 mm, a minor axis of 191 mm, a length of 152 mm, a partition wall thickness of 150 μm, and a cell density of 62 cells/cm² (400 cpsi).

Example 7

A cordierite-forming raw material was prepared in the same manner as in Example 1. As a binder, methyl cellulose (MC) used in Examples 2 and 4 having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), was added to the cordierite-forming raw material in an amount of 4 mass %. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 600 mm. The amount of curvature of the side surface of the dried honeycomb formed body was 0.8 mm. The dried honeycomb formed body was then cut to a given length to obtain five dried bodies. The dried honeycomb body thus obtained was fired at 1410 to 1440° C. for eight hours to obtain an elliptical honeycomb formed body of Example 7 having a diameter of 103 mm×a length of 100 mm, a partition wall thickness of 100 μm, and a cell density of 62 cells/cm² (400 cpsi).

Comparative Example 1

A cordierite-forming raw material was prepared in the same manner as in Example 1. As a binder, methyl cellulose (MC) having a weight average molecular weight (Mw) of 2,100,000 and a viscosity (2% aqueous solution) at 20° C. of 2000 mPa·s, and having an integral molecular weight distribution value of components having a molecular weight of 100,000 or less in the integral molecular weight distribution curve of 20 (A in Table 1) (also refer to FIG. 1), was added to the cordierite-forming raw material in an amount of 4 mass % (Comparative Example 1 in Table 2) as described in Table 1 and FIG. 1. The relationship between the weight average molecular weight and the integral molecular weight distribution value of components having a molecular weight of 100,000 or less in the integral molecular weight distribution curve of the methyl cellulose A used herein is indicated by the curve A shown in FIG. 1.

The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Comparative Example 1 having a diameter of 229 mm×a length of 152 mm, a partition wall thickness of 150 μm, and a cell density of 62 cells/cm² (400 cpsi).

Comparative Example 2

A cordierite-forming raw material was prepared in the same manner as in Example 1. As a binder, methyl cellulose (MC) having a weight average molecular weight (Mw) of 3,700,000 and a viscosity (2% aqueous solution) at 20° C. of 4000 mPa·s, and having an integral molecular weight distribution value of components having a molecular weight of 100,000 or less in the integral molecular weight distribution curve of 17 (B in Table 1), was added to the cordierite-forming raw material in an amount of 4 mass % (Comparative Example 2 in Table 2) as described in Table 1. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Comparative Example 2 having a diameter of 229 mm×a length of 152 mm, a partition wall thickness of 150 μm, and a cell density of 62 cells/cm² (400 cpsi).

Comparative Example 3

A cordierite-forming raw material was prepared in the same manner as in Example 1. As a binder, methyl cellulose (MC) having a weight average molecular weight (Mw) of 4,300,000 and a viscosity (2% aqueous solution) at 20° C. of 9000 mPa·s, and having an integral molecular weight distribution value of components having a molecular weight of 100,000 or less in the integral molecular weight distribution curve of 19 (E in Table 1), was added to the cordierite-forming raw material in an amount of 4 mass % (Comparative Example 3 in Table 2) as described in Table 1. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Comparative Example 3 having a diameter of 229 mm×a length of 152 mm, a partition wall thickness of 150 μm, and a cell density of 62 cells/cm²

(400 cpsi). The relationship between the integral molecular weight distribution value and the molecular weight of the methyl cellulose E is indicated by the curve E shown in FIG. 1.

Comparative Example 4

A cordierite-forming raw material was prepared in the same manner as in Example 1. As a binder, methyl cellulose (MC) having a weight average molecular weight (Mw) of 5,200,000 and a viscosity (2% aqueous solution) at 20° C. of 15,000 mPa·s, and having an integral molecular weight distribution value of components having a molecular weight of 100,000 or less in the integral molecular weight distribution curve of 12 (G in Table 1), was added to the cordierite-forming raw material in an amount of 4 mass % (Comparative Example 4 in Table 2) as described in Table 1. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Comparative Example 4 having a diameter of 229 mm×a length of 152 mm, a partition wall thickness of 150 μm, and a cell density of 62 cells/cm² (400 cpsi).

Comparative Example 5

A cordierite-forming raw material was prepared in the same manner as in Example 1. As a binder, methyl cellulose (MC) used in Comparative Example 1 having a weight average molecular weight (Mw) of 2,100,000 and a viscosity (2% aqueous solution) at 20° C. of 2000 mPa·s, and having an integral molecular weight distribution value of components having a molecular weight of 100,000 or less in the integral molecular weight distribution curve of 20 (A in Table 1), was added to the cordierite-forming raw material in an amount of 4 mass % as described in Table 1. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 600 mm. The amount of curvature of the side surface of the dried honeycomb formed body was 1.5 mm. The dried honeycomb formed body was then cut to a given length to obtain five dried bodies. The dried honeycomb body thus obtained was fired at 1410 to 1440° C. for eight hours to obtain an elliptical honeycomb formed body of Comparative Example 5 having a diameter of 103 mm×a length of 100 mm, a partition wall thickness of 100 μm, and a cell density of 62 cells/cm² (400 cpsi).

Reference Example 1

A cordierite-forming raw material was prepared in the same manner as in Example 1. As a binder, hydroxypropyl methyl cellulose (HPMC) having a weight average molecular weight (Mw) of 4,600,000 and a viscosity (2% aqueous solution) at 20° C. of 10,000 mPa·s, and having an integral molecular weight distribution value of components having a molecular weight of 100,000 or less in the integral molecular weight distribution curve of 14 (H in Table 1), was added to the cordierite-forming raw material in an amount of 4 mass % (Reference Example 1 in Table 2) as described in Table 1. The dispersion medium, the pore-forming material, and the surfactant were added in the same manner as in Example 1. A ceramic clay that was plasticized to allow extrusion was prepared, mixed, kneaded, deaired, and extruded to obtain an undried honeycomb formed body. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Reference Example 1 having a diameter of 229 mm×a length of 152 mm, a partition wall thickness of 150 μm, and a cell density of 62 cells/cm² (400 cpsi).

Reference Example 2

A cordierite-forming raw material was prepared in the same manner as in Example 1. As a binder, methyl cellulose (MC) used in Examples 2 and 4 having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 (D in Table 1), was added to the cordierite-forming raw material in an amount of 6 mass % (Reference Example 2 in Table 2) as described in Table 1. The dispersion medium, the pore-forming material, and the surfactant were added in the same manner as in Example 1. A ceramic clay that was plasticized to allow extrusion was prepared, mixed, and extruded to obtain an undried honeycomb formed body. These operations were performed using a mixer, a kneader, a vacuum deairing machine, and an extruder. The undried honeycomb formed body was dried using a dielectric dryer in the same manner as in Example 1 to obtain a dried honeycomb formed body having a length of 210 mm. The dried honeycomb formed body was then cut to a given length. The dried honeycomb formed body thus obtained was fired at 1410 to 1440° C. for eight hours to obtain a honeycomb formed body of Reference Example 2 having a diameter of 229 mm, a length of 152 mm, a partition wall thickness of 150 μm, and a cell density of 62 cells/cm² (400 cpsi).

The honeycomb formed bodies of Examples 1 to 6, Comparative Examples 1 to 4, and Reference Examples 1 and 2 were evaluated by the above evaluation methods. The results are shown in Table 2. The properties of the binder used for each honeycomb formed body are shown in Table 1. The results for Example 7 and Comparative Example 5 are shown in Table 3.

TABLE 1

| Binder | Type of binder | Viscosity (mPa·s) | Weight average molecular weight (Mw) | Integral molecular weight distribution value of components having molecular weight of 100,000 or less |
|---|---|---|---|---|
| A | MC | 2000 | 2,100,000 | 20 |
| B | MC | 4000 | 3,700,000 | 17 |
| C | MC | 6000 | 4,100,000 | 14 |
| D | MC | 8000 | 4,500,000 | 13 |
| E | MC | 9000 | 4,300,000 | 19 |
| F | MC | 11000 | 4,900,000 | 12 |
| G | MC | 15000 | 5,200,000 | 12 |
| H | HPMC | 10000 | 4,600,000 | 14 |

TABLE 2

| | Binder | Amount (mass %) | Contamination of dryer | State of outer wall of formed body | Roundness (mm) | Cracks during firing |
|---|---|---|---|---|---|---|
| Comparative Example 1 | A | 4 | Bad | Good | 1.8 | Bad |
| Comparative Example 2 | B | 4 | Bad | Good | 1.6 | Bad |
| Example 1 | C | 4 | Good | Good | 0.9 | Good |
| Example 2 | D | 4 | Good | Good | 0.8 | Good |
| Comparative Example 3 | E | 4 | Bad | Good | 1.1 | Bad |
| Example 3 | F | 4 | Good | Good | 0.7 | Good |
| Comparative Example 4 | G | 4 | Good | Bad | 1.5 | Good |
| Reference Example 1 | H | 4 | Good | Good | 2.1 | Good |
| Example 4 | D | 5 | Good | Good | 0.7 | Good |
| Reference Example 2 | D | 6 | Good | Good | 0.6 | Bad |
| Example 5 | D | 2 | Good | Good | 0.9 | Good |
| | H | 2 | | | | |
| Example 6 | D | 4 | Good | Good | 0.7*[1] | Good |

*[1] The roundness of Example 6 is a value that indicates deformation with respect to the outer circumferential surface.

TABLE 3

| | Binder | Amount (mass %) | Contamination of dryer | State of outer wall of formed body | Curvature (mm) | Cracks during firing |
|---|---|---|---|---|---|---|
| Example 7 | D | 4 | Good | Good | 0.8 | Good |
| Comparative Example 5 | A | 4 | Bad | Good | 1.5 | Good |

(Discussion)

In Examples 1 to 6, contamination of the dryer did not occur, and an excellent forming state was achieved, as shown in Table 2. The roundness was 1 mm or less, and cracks did not occur during firing. The amount of curvature of the dried body of Example 7 obtained by drying the long formed body having a length of 600 mm was as small as 1.0 mm or less, which is favorable.

On the contrary, in Comparative Example 1 in which the methyl cellulose (MC) having a weight average molecular weight (Mw) of 2,100,000 and a viscosity (2% aqueous solution) at 20° C. of 2000 mPa·s, and having an integral molecular weight distribution value of components having a molecular weight of 100,000 or less in the integral molecular weight distribution curve of 20 was used, contamination of the dryer occurred, the roundness was 1.8 mm, deformation occurred, and cracks occurred during firing. In Comparative Example 2 in which the methyl cellulose (MC) having a weight average molecular weight (Mw) of 3,700,000 and a viscosity (2% aqueous solution) at 20° C. of 4000 mPa·s, and having an integral molecular weight distribution value of components having a molecular weight of 100,000 or less in the integral molecular weight distribution curve of 17 was used, contamination of the dryer occurred, the roundness was 1.6 mm, deformation occurred, and cracks occurred during firing. In Comparative Example 3 in which the methyl cellulose (MC) having a weight average molecular weight (Mw) of 4,300,000 and a viscosity (2% aqueous solution) at 20° C. of 9000 mPa·s, and having an integral molecular weight distribution value of components having a molecular weight of 100,000 or less in the integral molecular weight distribution curve of 19 was used, contamination of the dryer occurred, the roundness was 1.1 mm, deformation occurred, and cracks occurred during firing. In Comparative Example 4 in which the methyl cellulose (MC) having a weight average molecular weight (Mw) of 5,200,000 and a viscosity (2% aqueous solution) at 20° C. of 15,000 mPa·s, and having an integral molecular weight distribution value of components having a molecular weight of 100,000 or less in the integral molecular weight distribution curve of 12 was used, the forming state was poor, and the roundness was 1.5 mm, deformation occurred, although contamination of the dryer did not occur.

The amount of curvature of the dried body of Example 7 obtained by drying the long formed body having a length of 600 mm was as small as 1.0 mm or less, which is favorable. In Comparative Example 5 in which the methyl cellulose (MC) having a weight average molecular weight (Mw) of 2,100,000 and a viscosity (2% aqueous solution) at 20° C. of 2000 mPa·s, and having an integral molecular weight distribution value of components having a molecular weight of 100,000 or less in the integral molecular weight distribution curve of 20 was used, contamination of the dryer occurred, and the amount of curvature of the dried body was 1.5 mm (i.e., deformation occurred). The above results demonstrate that Comparative Examples 1 to 5 are impractical.

In Reference Example 1 in which only the hydroxypropyl methyl cellulose having a weight average molecular weight (Mw) of 4,600,000 and a viscosity (2% aqueous solution) at 20° C. of 10,000 mPa·s, and having an integral molecular weight distribution value of components having a molecular weight of 100,000 or less in the integral molecular weight distribution curve of 14 was used as a binder, results similar to those of the examples were obtained with regard to the state of the outer wall of the formed body and occurrence of cracks during firing. However, the roundness was inferior to those of the examples. In Reference Example 2 in which methyl cellulose (MC) having a weight average molecular weight (Mw) of 4,500,000 and a viscosity (2% aqueous solution) at 20° C. of 8000 mPa·s, and having an integral molecular weight distribution value of components having a molecular weight of 100,000 or less in the integral molecular weight distribution curve of 13 was used in an amount of 6 mass % that exceeds the upper limit (4 mass %) of the present invention, results similar to those of the examples were obtained with regard to the state of the outer wall of the formed body and the roundness. However, cracks occurred during firing.

The method of producing a honeycomb structure according to the present invention may be suitably utilized to purify $NO_x$, hydrocarbons, collect or purity particulate matter contained in exhaust gas discharged from an internal combustion engine (e.g., diesel engine, ordinary vehicle engine, and large-size vehicle (e.g., truck and bus) engine), or a combustion apparatus.

What is claimed is:

1. A method of producing a honeycomb structure, comprising:
    forming a raw material including a ceramic raw material, a binder, and a dispersion medium;
    kneading the raw material;
    extruding the kneaded raw material to produce a honeycomb structure; and
    drying the honeycomb structure,
    wherein at least part of the binder comprises a methyl cellulose having (1) a weight average molecular weight of 4,000,000 to 5,000,000 and (2) an integral molecular weight distribution value of components having a molecular weight of 100,000 or less in an integral molecular weight distribution curve of 15 or less.

2. The method according to claim 1, wherein the methyl cellulose is present in an amount of 2 to 5 mass % based on the total amount of the ceramic raw material for forming a honeycomb formed body.

3. The method according to claim 1, wherein hydroxypropyl methyl cellulose in an amount of 2 mass % or less is present in combination with the methyl cellulose in an amount of 2 mass % or more so that the total amount of the hydroxypropyl methyl cellulose and the methyl cellulose is 5 mass % or less, based on the total amount of the ceramic raw material.

4. The method according to claim 1, wherein the honeycomb structure has an outer diameter of 229 mm or more and a roundness of 1 mm or less.

5. The method according to claim 1, wherein the honeycomb structure has a length of 500 mm or more and an amount of curvature of 1 mm or less after drying.

6. The method according to claim 1, wherein a dielectric dryer is used in the drying step.

* * * * *